March 24, 1964 K. W. REILLY 3,126,232
PROTECTIVE HUB CLOSURE
Filed April 16, 1962
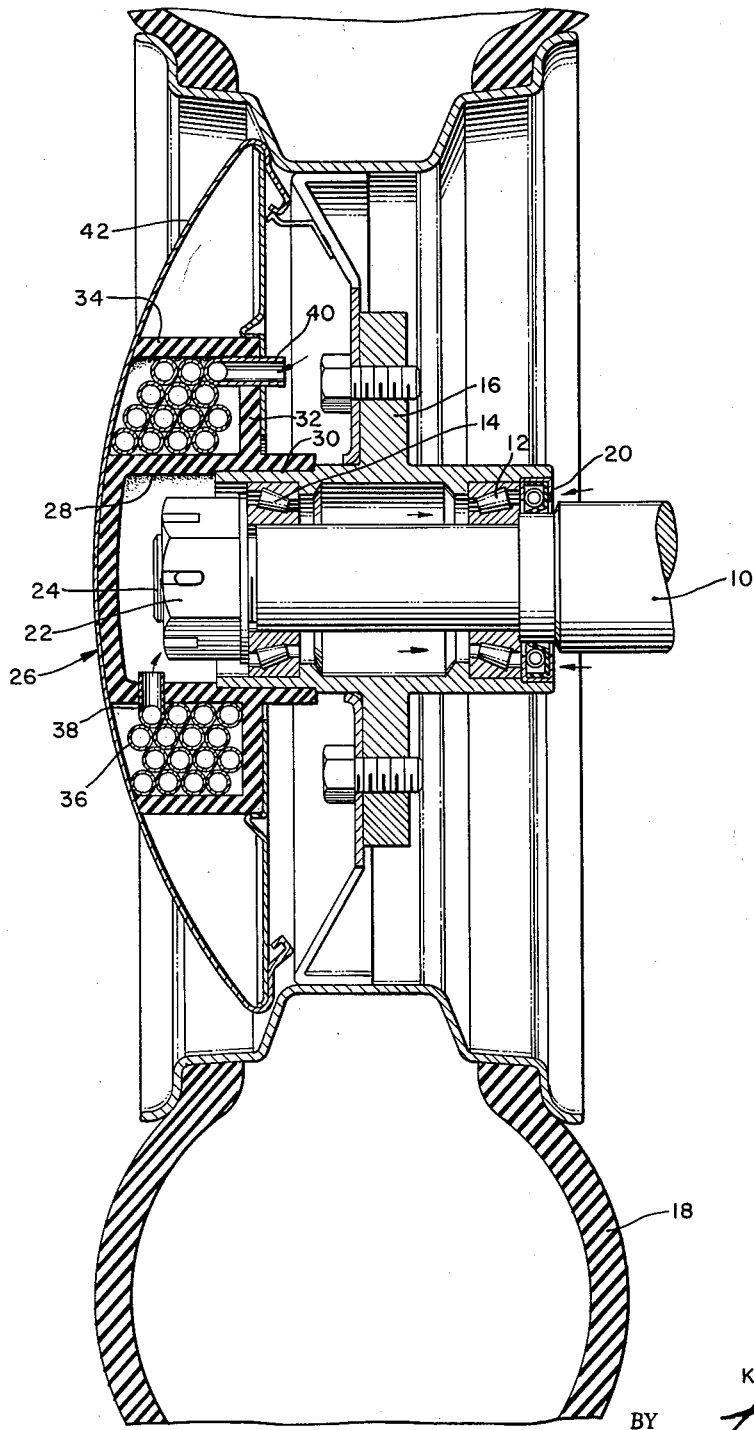
INVENTOR.
KENNETH W. REILLY
BY
ATTORNEYS.

United States Patent Office 3,126,232
Patented Mar. 24, 1964

3,126,232
PROTECTIVE HUB CLOSURE
Kenneth W. Reilly, 7827 Dunbarton Ave.,
Los Angeles 45, Calif.
Filed Apr. 16, 1962, Ser. No. 187,791
3 Claims. (Cl. 308—36.3)

This invention relates to a protective hub for a boat trailer.

In a conventional boat trailer an axle is supported between suitable bearings in the wheel hubs. When the boat is launched or retrieved, it is common to roll the trailer to a position wherein the axle and wheel hubs are submerged exposing same to damaging effect of exposure to water as well as entry of foreign matter therein.

It is an object of this invention to provide a device which is readily and easily applied to the wheel hub and which will keep same out of contact with water and the like.

It is an object of this invention to utilize the water pressure which would normally cause the water to enter the hub to create sufficient air pressure within the hub to exclude entry of water.

Still a further object of this invention is to provide means for balancing the air pressure on each side of the hub protector to prevent water flow therethrough and dislodgment thereof.

Other objects and advantages will be readily apparent from the following description.

In the drawings:

The figure is a side elevation in section of a device embodying this invention.

One extremity of trailer axle 10 is illustrated supported by bearings 12 and 14 in wheel hub 16 which carries tire 18. A water tight seal 20 is provided adjacent bearing 12. A nut 22 screws onto the threaded extremity 24 of the axle holding the wheel hub in place. The above described structure is conventional and this invention is directed to the protection of the exposed end of the axle and the hub.

A protective hub 26 is formed preferably of a material relatively inert in water such as rubber or the like. A closed cup like central portion 28 snugly fits over the end of hub 16 forming a water tight seal therewith as at 30. An outwardly projecting flange 32 is formed integrally with central portion 28 and has its extremity 34 bent at approximately a right angle forming a housing for tubing 36. The tubing is coiled between the central portion 28 and bent extremity 34 many times and has one extremity pierce the central portion as at 38 and the other pierce flange 32 as at 40.

A cover or hub 42 may be utilized to enclose the protective hub and releasably engage wheel hub 16.

In operation as the air inside the central portion 28 of the protective device expands due to heat during driving, it may exhaust through tubing 36. When the device is submerged the air will contract and water enter the tubing 36 until a state of balance is reached in one of the coils of the tubing thereby preventing water reaching the inside of central portion 28. The same air pressure within the hub assists seal 20 to exclude entry of water.

While what hereinbefore has been described as the preferred embodiment of this invention, it is readily apparent that modifications and alterations can be made without departing from the scope of the invention.

I claim:

1. A protective device for isolating a wheel hub and its axle from water when submerged comprising: a protective hub adapted to fit upon the wheel hub and enclose same and its axle to form a seal with said wheel hub, a tubing communicating the outside of said protective hub, with the interior thereof and coiled about said protective hub whereby water will not enter said protective hub when same is submerged.

2. A protective device for isolating a wheel hub and its axle from water when submerged comprising: a protective hub adapted to fit over a wheel hub and to enclose the hub and its axle, a tubing coiled around said protective hub, flange means upon said protective hub housing said coiled tubing, an end of said tubing piercing said protective hub to equalize pressure within and without said protective hub preventing water entering same when submerged.

3. A protective device for isolating a wheel hub and its axle from water when submerged comprising: a protective hub adapted to fit over a wheel hub and to enclose the hub and its axle, a tubing coiled around said protective hub, flange means upon said protective hub housing said coiled tubing, an end of said tubing piercing said protective hub to equalize pressure within and without said protective hub preventing water entering same when submerged, the other end of said tubing piercing said flange securing same in place.

References Cited in the file of this patent

UNITED STATES PATENTS

| | | |
|---|---|---|
| 2,657,104 | Kayser | Oct. 27, 1953 |
| 2,889,139 | Hedberg | June 2, 1959 |
| 3,003,834 | Pendleton | Oct. 10, 1961 |